United States Patent
Fukaya et al.

(10) Patent No.: US 6,591,156 B1
(45) Date of Patent: Jul. 8, 2003

(54) METHOD AND APPARATUS FOR PROVIDING NUMERICAL CONTROL INFORMATION

(75) Inventors: Yasushi Fukaya, Oguchi-cho (JP); Naoki Morita, Yamatokoriyama (JP); Sadayuki Matsumiya, Kawasaki (JP); Kazuo Yamazaki, 44204 Greenview Dr., El Macero, CA (US) 95618

(73) Assignees: Okuma Corporation, Nagoya (JP); Mori Seiki Co., Ltd., Yamatokoriyama (JP); Mitutoyo Corporation, Kawasaki (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/622,539

(22) PCT Filed: Dec. 25, 1998

(86) PCT No.: PCT/JP98/05902

§ 371 (c)(1),
(2), (4) Date: Aug. 18, 2000

(87) PCT Pub. No.: WO00/38881

PCT Pub. Date: Jul. 6, 2000

(51) Int. Cl.[7] ............................................. G06F 19/00
(52) U.S. Cl. ..................... 700/159; 700/145; 700/160; 700/183; 700/165; 700/29; 700/86
(58) Field of Search ........................ 700/159, 86, 145, 700/160, 165, 29, 183

(56) References Cited

U.S. PATENT DOCUMENTS

| | | | | |
|---|---|---|---|---|
| 5,122,717 A | * | 6/1992 | Hayashi | 318/569 |
| 5,877,959 A | * | 3/1999 | Kamiyama et al. | 700/159 |
| 5,930,141 A | * | 7/1999 | Kamiyama et al. | 700/159 |
| 6,266,572 B1 | * | 7/2001 | Yamazaki et al. | 700/96 |
| 6,363,298 B1 | * | 3/2002 | Shin et al. | 700/160 |
| 6,401,004 B1 | * | 6/2002 | Yamazaki et al. | 318/568.1 |

FOREIGN PATENT DOCUMENTS

| | | |
|---|---|---|
| JP | 64-87133 | 3/1989 |
| JP | 2-53107 | 2/1990 |
| JP | 2-109657 | 4/1990 |
| JP | 6-155235 | 6/1994 |
| JP | WO/98/19820 | 5/1998 |

* cited by examiner

*Primary Examiner*—Ramesh Patel
*Assistant Examiner*—Thomas Pham
(74) *Attorney, Agent, or Firm*—Oliff & Berridge PLC

(57) ABSTRACT

An apparatus and method for generating numerical control information for numerically controlling machine tools. Contents of corrective editing or correction to numerical control information by a processing operator is written and stored in a processing method database as processing knowledge of the processing engineer. When a programmer generates new numerical control information, a suitable processing method can be used from the processing method database. The knowledge included processing conditions by the processing operator. The information in the processing method database is updated at each and every processing.

7 Claims, 7 Drawing Sheets

| PROCESSING ELEMENT TYPE | PROCESSING DIMENSION | PROCESSING PRECISION | WORK ELEMENT TYPE | TOOL TYPE | TOOL MATERIAL | TOOL DIMENSION | PROCESSING OPERATION PATTERN | CUTTING SPEED | CUTTING AMOUNT/ DEPTH | RETURN DEPTH | FEEDRATE |
|---|---|---|---|---|---|---|---|---|---|---|---|
| DRILL HOLE | HOLE RADIUS 10.0/ HOLE DEPTH 20.0/ BEVELING AMOUNT 1.0 | — | CENTERING/ BEVELING | DRIL-LING | HIGH-SPEED STEEL | RADIUS 30.0 | CENTERING/ BEVELING CYCLE | 20m/min | 3.0mm | — | 0.1mm/rev |
| | | | DRILLING | DRIL-LING | EXTREMELY HARD | RADIUS 10.0 | DRILLING CYCLE | 100m/min | 5.0mm | — | 0.15mm/rev |
| WASHER FACED HOLE | WASHER FACED HOLE RADIUS 20.0/ WASHER FACED HOLE DEPTH 5.0/ BEVELING AMOUNT 1.5/HOLE RADIUS 15.0/ HOLE DEPTH 45.0 | SURFACE ROUGHNESS ▽▽▽ | CENTERING/ BEVELING | DRIL-LING | HIGH-SPEED STEEL | RADIUS 30.0 | CENTERING/ BEVELING CYCLE | 20m/mm | 3.0mm | — | 0.1mm/rev |
| | | | DRILLING | DRIL-LING | EXTREMELY HARD | RADIUS 14.0 | DRILLING CYCLE | 100m/min | 6.0mm | — | 0.15mm/rev |
| | | | HOLE CIRCLE END MILL | TWO-FLUTE END MILL | EXTREMELY HARD | RADIUS 12.0 | HOLE CIRCLE CYCLE | 50m/mm | 0.5mm/ 5.0mm | — | 0.2mm/rev |

Fig. 7

METHOD AND APPARATUS FOR PROVIDING NUMERICAL CONTROL INFORMATION

BACKGROUND OF THE INVENTION

1. Field of the Invention

The present invention relates to an apparatus and method for generating numerical control information by first writing and storing, as a processing method database, changes to a processing method extracted from numerical control information and to a processing method extracted during a processing operation using numerical control information and then searching for and using a suitable processing method based on the processing method database.

2. Description of the Related Art

An operation of a numerical control machine tool can be automatically controlled by inputting numerical control information and is recently used in a wide variety of fields such as microprocessors, power electronics, and as a computer controlled machine tool (CNC machine tool) by combining with software.

Typically, numerical control information such as an NC program is constructed from a tool changing instruction, a spindle speed instruction, a cutting rate instruction, a feedrate instruction, an axis movement/interpolation instruction, and a miscellaneous function instruction, etc., and numerical control information suitable for a machine tool which is the processing control object is generated each time.

Generally, the numerical control information is automatically generated at a programming room by inputting raw material data and final component shape (or processing element for forming the final component shape) to a numerical control information generating apparatus such as a CAM and an automatic programming apparatus. More specifically, the numerical control information generating apparatus automatically determines a sequence of work elements required to complete the input processing element (or a processing element automatically identified from the input final component shape), then determines tools to be used, cutting condition, and processing operation pattern for each of the determined work elements, and finally, automatically generates a numerical control information which includes, as mentioned above, a tool changing instruction, a spindle speed instruction, a cutting rate instruction, a feedrate instruction, an axis movement/interpolation instruction, and a miscellaneous function instruction, etc., based on the determined processing method.

The above mentioned numerical control information generating apparatus generally refers to a processing method database which includes the determination rules when it determines the work elements, tools, cutting conditions, and processing operation patterns. A programmer using the numerical control information generating apparatus needs to perform some maintenance work such as continuously updating the processing method database in order to obtain a desired determination result.

The numerical control information generated at the programming room, on the other hand, is transported to the processing site and is most often corrected by a processing operator. In practice, the processing operator inputs the numerical control information given from the programming room to the CNC machine tool, adjusts (corrects and edits) the numerical control information by repeating test cuttings, completes the numerical control information to be finally used in the processing, and uses the numerical control information for processing control of the machine tool.

In a processing of a component with a small lot number, there are cases where the processing operator would not correct or edit the numerical control information, but instead, complete component processing for a desired number for the lot by correcting the cutting condition using various operation switches on the NC operation panel, such as a feedrate override switch, etc.

In order to use the contents of the corrective editing and correction manipulation that are performed by the processing operator as processing know-how of a processing engineer who actually performs the processing work for the next numerical control information generation, this knowledge must be reflected in the processing method database of the numerical control information generating apparatus in the programming room. However, this reflection of knowledge requires the programmer to specify, sort, classify, and execute the correction content each time the processing operator makes a correction. Thus, in practice, this reflection has not been performed. As a result, quality improvement of the numerical control information could not be achieved, and for each and every processing, the processing operator must repeat the corrective editing and correction operation.

When a CNC machine tool user who had been manually generating the numerical control information decides to introduce a numerical control information generating apparatus to improve efficiency, he will encounter the following difficulty.

Initial data, which is determined by the maker of the apparatus, is installed as the processing method database when the apparatus is first introduced. This initial data is usually not suited to the user's particular processing method. Therefore, the user must sort and classify the processing knowledge that has been accumulated while he generated the numerical control information manually and customize the processing method database based on the result of the sorting and classification. This process itself requires a lot of labor and man power.

As explained above, in the conventional numerical control information generating apparatus, it was not easy to immediately reflect the correction to the numerical control information in the processing method database based on experience and knowledge of the processing operator obtained from using the CNC machine tool to perform the processing work. Also, it was not easy to newly customize the processing method database based on the processing know-how accumulated over the years by a CNC machine tool user.

The present invention is conceived to solve the above-mentioned problem and an object of the present invention is to provide an apparatus for generating suitable numerical control information by writing and storing, in a processing method database, a numerical control information corrective edited by a processing operator or a processing method extracted from numerical control information used for a long period of time, searching a suitable processing method through the processing method database when a programmer newly generates a numerical control information, and using the search result. Another object of the present invention is to provide an apparatus for generating a suitable numerical control information by writing and storing, in the processing method database, extracted operation interrupting manipulation performed by a processing operator during the processing operation through various switches on the NC manipulation panel and the processing condition that has been changed, searching for a suitable processing method through the processing method database when a programmer newly generates a numerical control information, and using the search result.

SUMMARY OF THE INVENTION

The apparatus and method according to the present invention comprise: means or a step for writing and storing a work expansion model extracted for each processing element type based on numerical control information as a work expansion database; means or a step for writing and storing a tool, a cutting condition, or a processing operation pattern for each work element type based on the numerical control information as a work method database; means or a step for specifying the processing element type; means or a step for searching through the work expansion database for the work expansion model suited to the specified processing element type; means or a step for searching though the work method database for a tool, a cutting condition, or a processing operation pattern required for processing of each of the work elements used by the searched work expansion model; and means or a step for generating numerical control information using the searched result.

According to another aspect of the present invention, measurement information measured by a measuring device is added to the work expansion model to be written and stored in the work expansion database, the means for specifying the processing element type is means capable of specifying both the processing element type and the processing precision, the means for searching the work expansion model is means for searching through the work expansion database for the work expansion model corresponding to the specified processing element type and processing precision, and the means for searching tools, cutting conditions, or processing operation patterns required for the processing is means for searching the tools, cutting conditions, or processing operation patterns corresponding to the specified processing precision.

According to another aspect of the present invention, there is provided a numerical control information generating apparatus and method having a work method database for determining a cutting condition or a processing operation pattern of a work element, for generating numerical control information based on the cutting condition or the processing operation pattern determined by using the work method database, the numerical control information generating apparatus and method comprising: means or a step for writing and storing changed cutting condition or processing operation pattern using the numerical control information as an operation interrupting manipulation history database; and means or a step for generating numerical control information giving higher priorities to the changed cutting conditions and processing operation patterns stored in the operation interrupting manipulation history database when numerical control information is generated based on the cutting conditions or the processing operation patterns determined by using the work method database.

The present invention also includes a medium in which computer programs for executing each of the steps are stored.

BRIEF DESCRIPTION OF THE DRAWING(S)

FIG. 7 shows an example of processing method data of the present invention.

DESCRIPTION OF PREFERRED EMBODIMENT(S)

Figure 1:
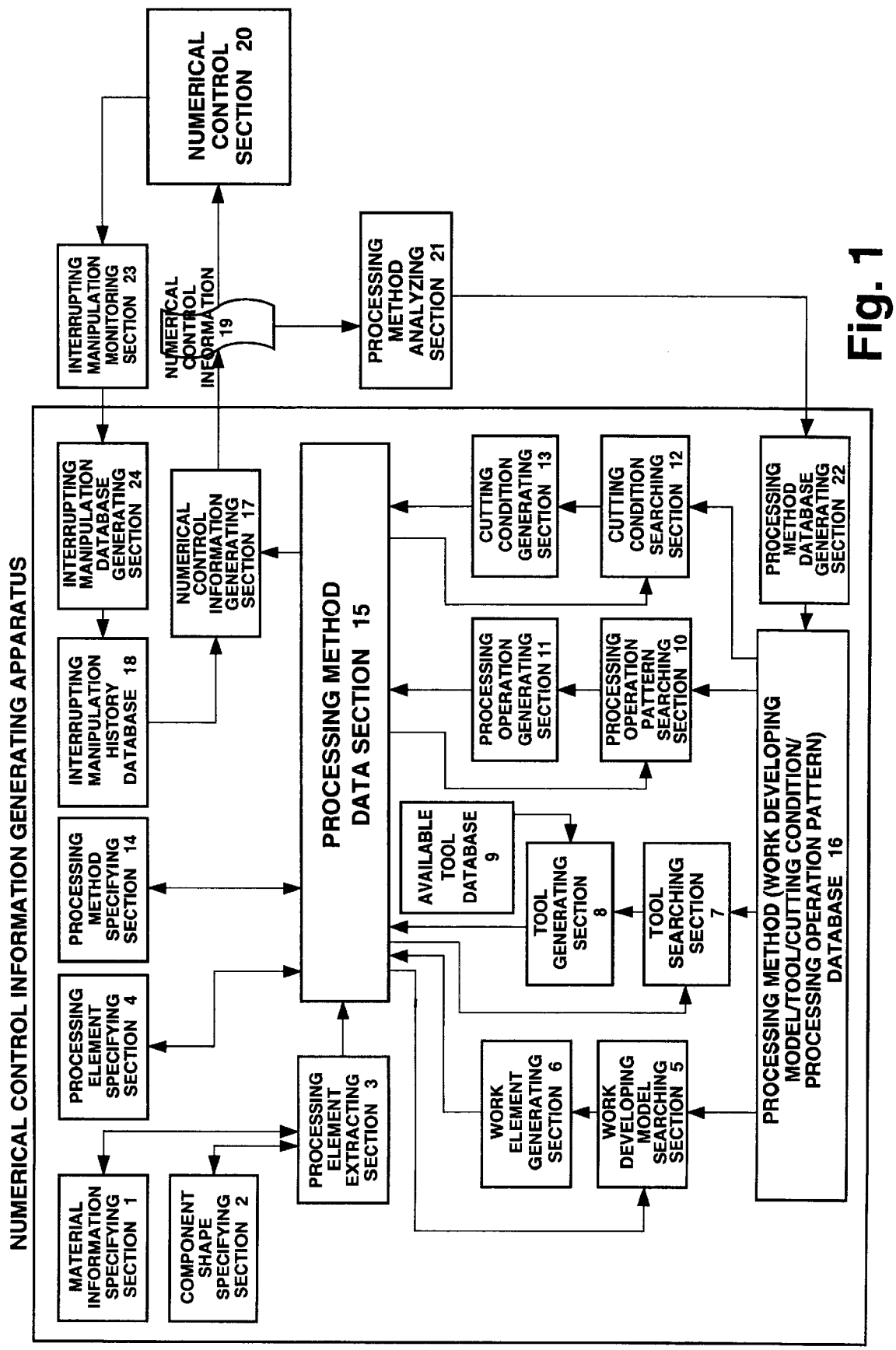
FIG. 1 is a block diagram of the present invention.

The preferred embodiments of the present invention are described hereinafter referring to the drawings.

FIG. 1 is an explanatory diagram showing a numerical control information generating apparatus according to the present invention connected to a numerical control section 20, a processing method analyzing section 21, and an operation interrupting manipulation monitoring section 23. The numerical control information generating apparatus generates and outputs numerical control information 19 and the numerical control section 20 executes a numerical control operation of a machine tool (not shown) based on the numerical control information 19.

The processing method analyzing section 21 is described in a previously filed application, "Analytical Method and Apparatus of NC Program in NC Processing" (PCT/JP96/03264), and has a function to read the numerical control information 19 and to extract processing elements, work elements required for completing the processing element, tools needed for each of the work elements, processing operation patterns, and cutting conditions from the numerical control information.

The operation interrupting manipulation monitoring section 23 is described in a previously filed application, "Operation Manipulation History Collecting Method and Apparatus" (PCT/JP98/03746), and has a function to monitor and extract changing operations of the cutting condition and of the processing operation, executed by the operator during the processing operation following the numerical control information 19.

The processing method analyzing section 21 and the operation interrupting manipulation monitoring section 23 can be incorporated into the numerical control apparatus including the numerical control section 20, can be separate devices from the numerical control apparatus, or incorporated into the numerical control information generating apparatus. The numerical control section 20 can be integrated with the numerical control information generating apparatus. In the present invention, there is no need to limit the combination and structure of these sections.

A programmer for generating a numerical control information inputs material information data and component shape data through a material information specifying section 1 and a component shape specifying section 2. It is also possible to input the material information data and the component shape data without human intervention, by using CAD etc.

A processing element extracting section 3 extracts a processing element type, processing dimension, and processing precision required for completing the desired component processing from the material information data and the component shape data, and writes to a processing method data section 15 as processing element information. The programmer can also directly input, as the processing element information, the processing element type, processing dimension, and processing precision required for completing the desired component processing to the processing method data section 15 through a processing element specifying section 4. In this manner, the processing element information is first written to the processing method data section 15 through either the processing element extracting section 3 or processing element specifying section 4.

Then, a work expansion model searching section 5 reads the processing element information written in the processing method data section 15, searches for a work expansion model required for completing the processing element through a processing method database 16, and if there is a suitable work expansion model, notifies a work element generating section 6 of the model. The work element generating section 6 writes the work element information used in the work expansion model to the processing method data section 15. If no suitable work expansion model is found, the programmer directly inputs the work element information through a processing method specifying section 14. When a plurality of work expansion models are found, the programmer selects one of the work expansion models and inputs the work element information through the processing method specifying section 14.

Then, a tool searching section 7 identifies suitable tools for processing the work element written to the processing method data section 15 by searching through the processing method database 16 and notifies a tool generating section 8 of the tool information about the tools. The tool generating section 8 searches through an available tool database 9 for a tool that conforms with the notified tool information and if there is such a tool, writes the tool information to the processing method database 15. If there are no tool or a plurality of tools, the programmer either directly inputs the tool information or selects one of the tools and inputs the tool information through the processing method specifying section 14.

Next, a processing operation pattern searching section 10 identifies a processing operation pattern suited for processing the work element written in the processing method data section 15 by the tool written also in the data section 15 by searching through the processing method database 16 and notifies a processing operation pattern generating section 11 of the processing operation pattern information. If no suitable processing operation pattern is found after searching, the processing operation pattern searching section 10 identifies, by searching again, a processing operation pattern for a case where the same work element is processed by a similar tool and notifies the processing operation pattern generating section 11 of the processing operation pattern information. The processing operation pattern generating section 11 writes the notified processing operation pattern information to the processing method data section 15.

Then, a cutting condition searching section 12 identifies a suitable cutting condition for processing the work element using tools by the processing operation pattern, all of which are written in the processing method data section 15, by searching the processing method database 16 and notifies a cutting condition generating section 13 of the cutting condition information. If no suitable cutting condition is found during the search, the cutting condition searching section 12 identifies, by searching again, a cutting condition for a case where the same work element is processed by a similar tool and notifies the cutting condition generating section 13 of the cutting condition information. The cutting condition generating section 13 writes the notified cutting condition information to the processing method data section 15.

In this manner, the processing element information, the work element information, the tool information, the processing operation pattern information, and the cutting condition information, all of which match the processing element information are sequentially written to the processing method data section 15. The programmer can rewrite this information written by each of the searching and generating sections, through the processing method specifying section 14 as he desires.

Finally, a numerical control information generating section 17 reads information about the work element, the tool, the processing operation pattern, and the cutting condition from the processing method data section 15 and generates numerical control information 19 for each work element. During this procedure, the numerical control information generating section 17 identifies, for each of the work elements, if there has been changes by the operator on the cutting conditions or on the processing operation patterns during the processing operation by searching an operation interrupting manipulation history database 18. When there is any change history, the changes are given higher priorities than the cutting conditions and the processing operation patterns written in the processing method data section 15 and the numerical control information 19 is generated based on the cutting conditions and processing operation patterns written in the operation interrupting manipulation history database 18.

The procedures for generating the numerical control information 19 has been described referring to FIG. 1. The processing method database 16 and processing method database generating section 22, and the operation interrupting manipulation history database 18 and operation interrupting manipulation database generating section 24 shown in FIG. 1 are described hereinafter referring to the FIGS. 2, 3, 4, 5, and 6.

Figure 2:
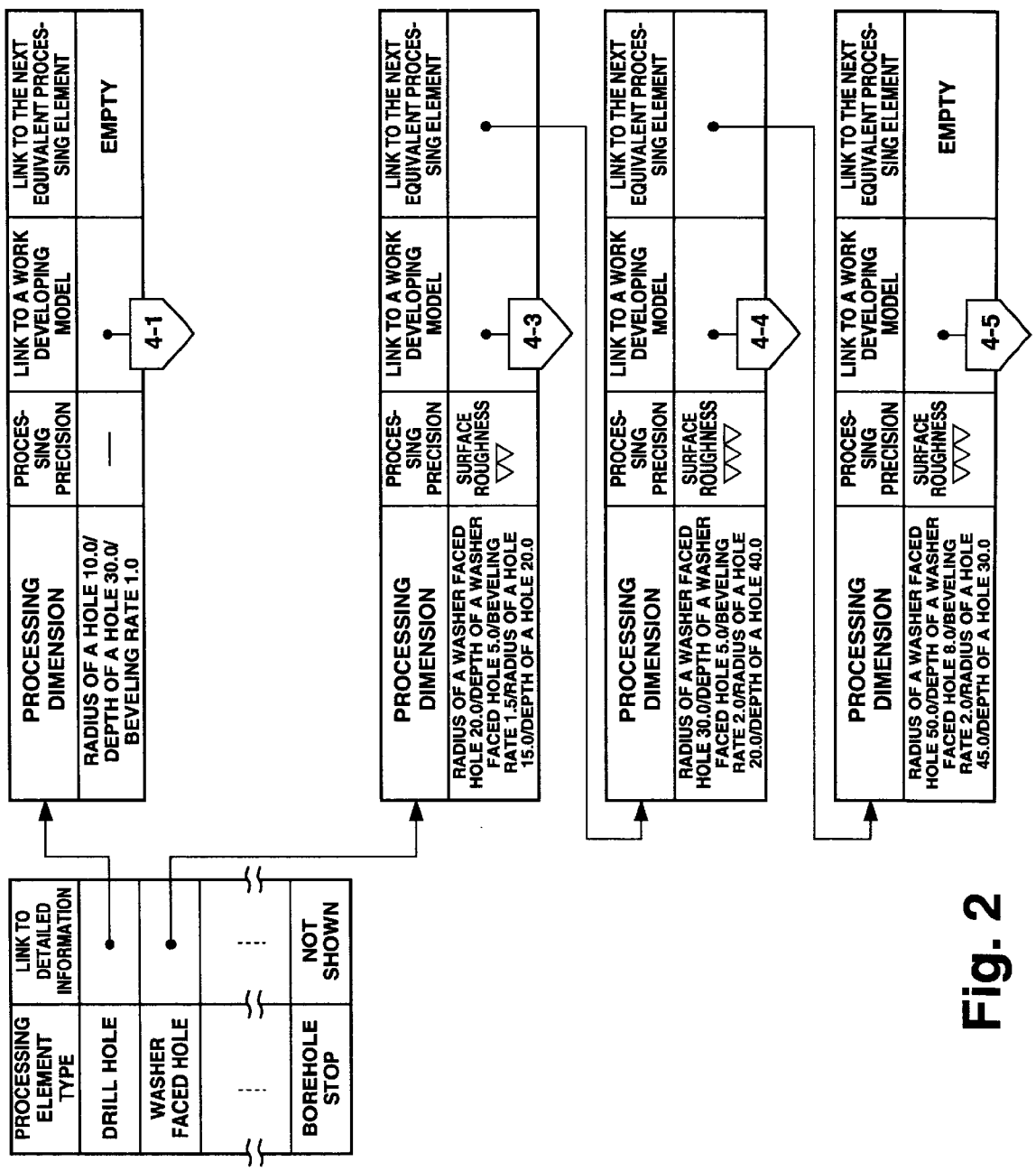
FIG. 2 shows an example of a processing method database according to the present invention.
Figure 3:
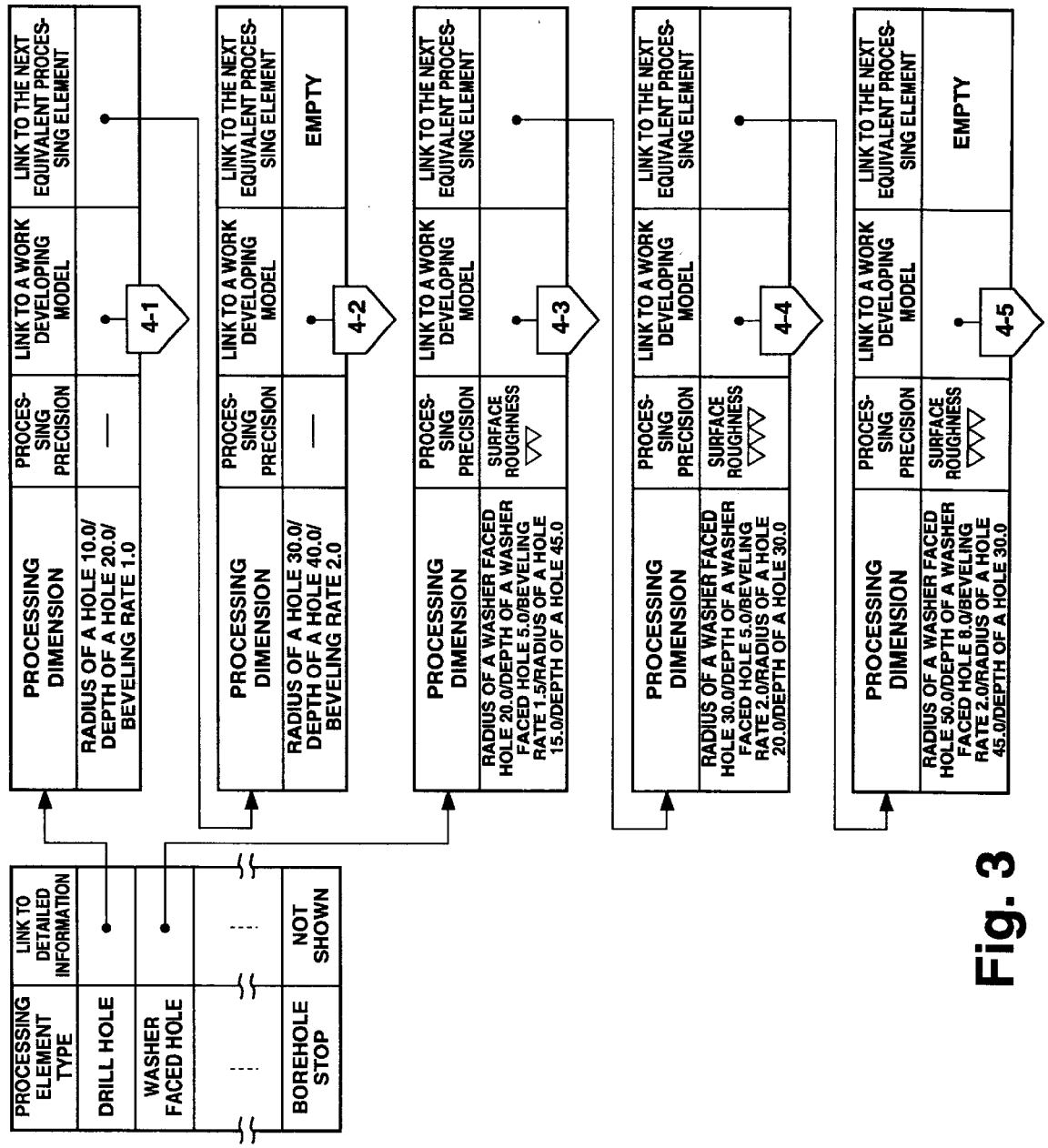
FIG. 3 shows another example of a processing method database according to the present invention.

FIG. 2 shows a portion of the processing method database and indicates that each processing element has link information to the processing precision, the processing dimension, and the work expansion model for completing the processing element as detailed information and link information to the detailed information for the same processing element but different processing precision, different processing dimension, and different work expansion model. FIG. 2 shows a case where only one detailed information item is present as a drill hole processing element. If new work element, tool, processing operation pattern, and cutting condition are extracted for a new drill hole processing element by analyzing the numerical control information 19 by the processing method analyzing section 21, the processing method database generating section 22 updates the processing method database for the drill hole processing element based on the various extracted information. FIG. 3 shows a case where new detailed information for the drill hole processing element is added to the case of FIG. 2.

Figure 4:
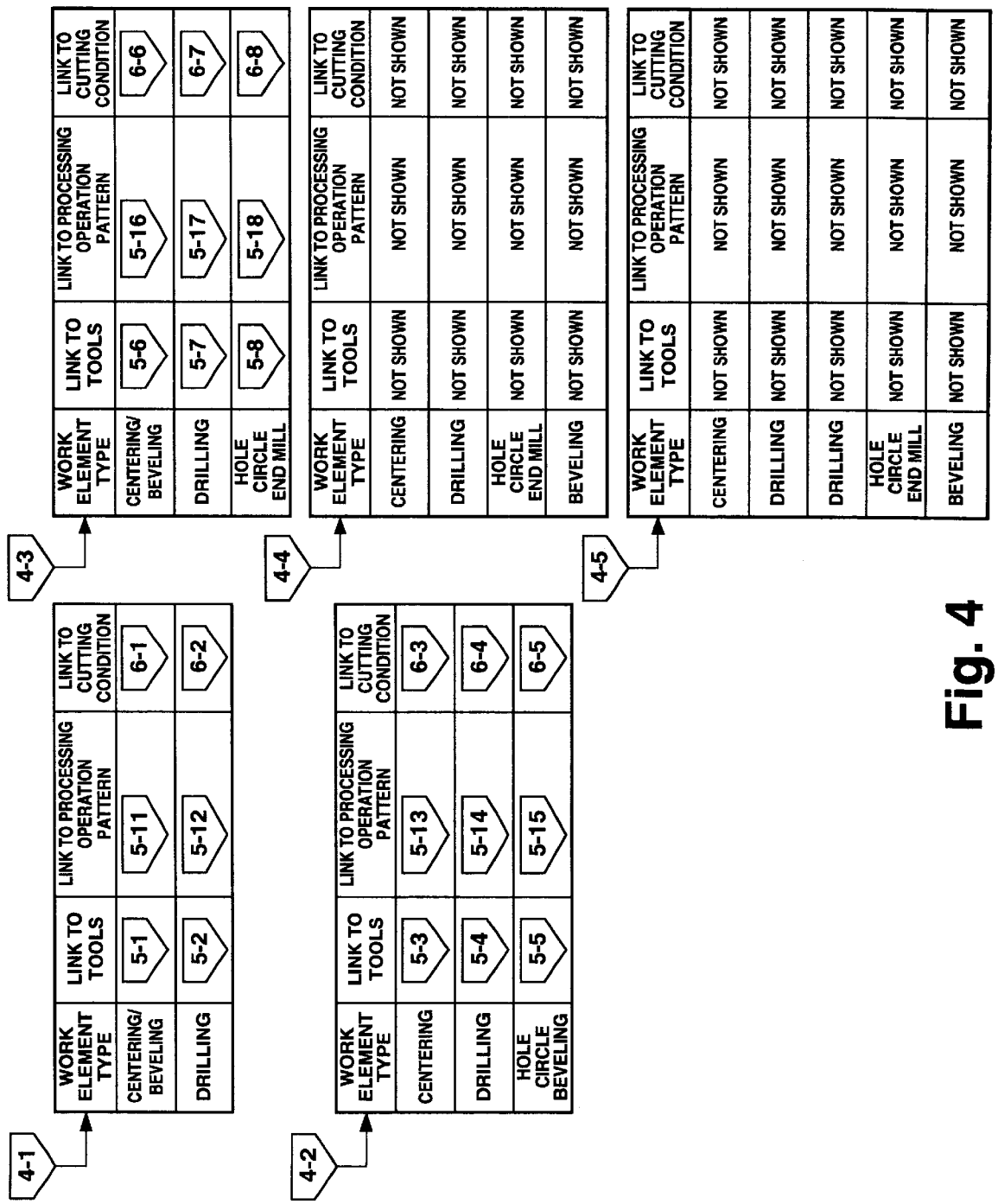
FIG. 4 shows yet another example of a processing method database.

FIG. 4 shows information about a work expansion model linked at the link information to a work expansion model of each of the processing elements. For example, the work expansion model linked at the connection 4-1 for drill hole processing element is shown to perform the center operation and beveling operation as a first work element and to execute the drill work element as a second work element. Moreover, for each of the work elements, link information is present for the tool required for the processing, the processing operation pattern using the tool, and the cutting condition for operating the tool in the processing operation pattern.

Figure 5:
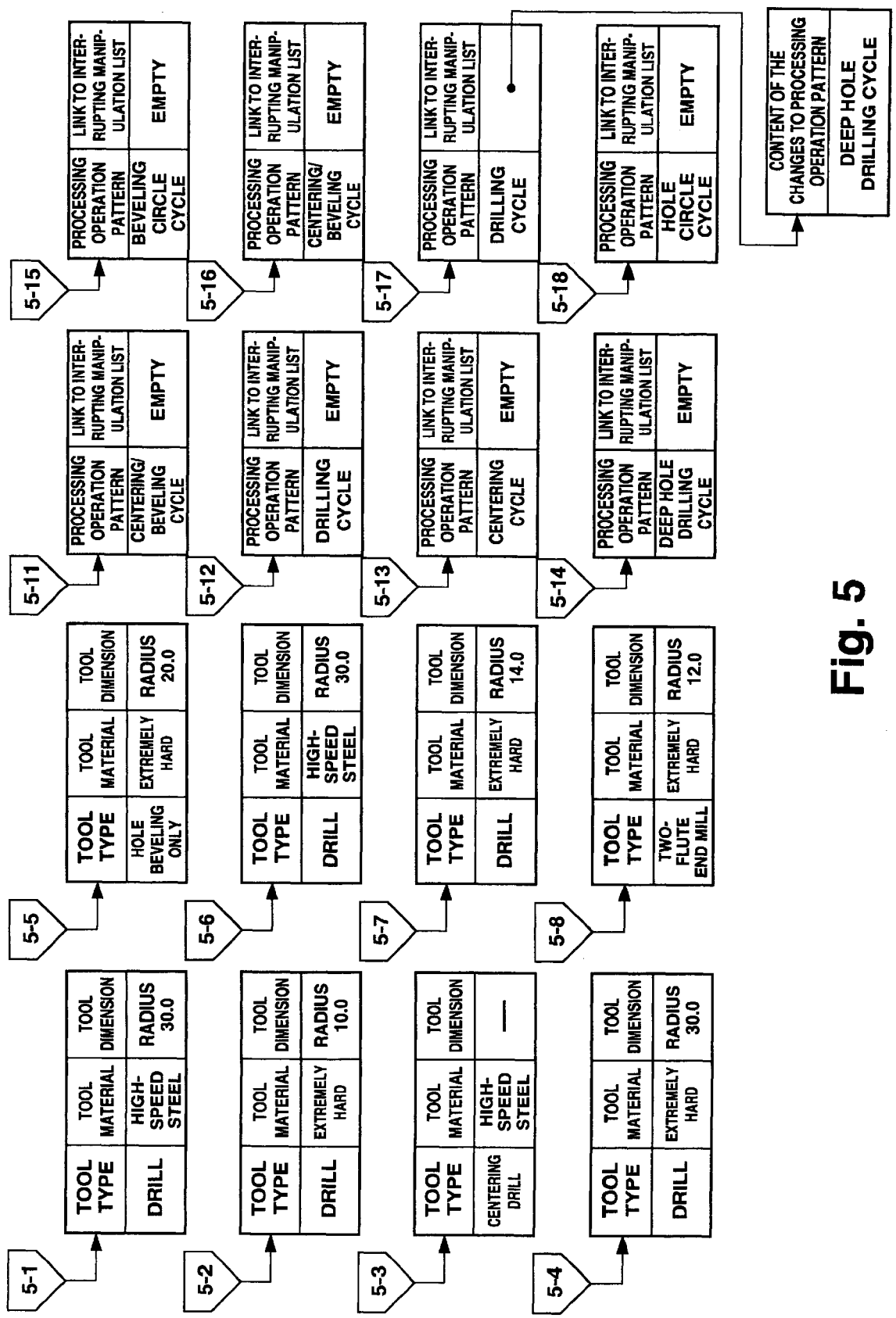
FIG. 5 shows an example of a processing method database and an operation interrupting manipulation history database according to the present invention.

FIG. 5 shows linked information of the tool required for processing and processing operation pattern, linked from each of the work elements. For example, the figure shows that the type of the center and beveling work element linked at a connection 5-1 is a drill, the material is high-speed steel, and the drill radius which is the tool dimension is 30.0 mm, and that the processing operation pattern of the hole circle end mill work element linked at a connection 5-18 is the hole circle cycle.

FIG. 5 further shows change information of the processing operation pattern linked from each of the work elements, the change information being a portion of the operation interrupting manipulation history database 18, shown in FIG. 1. The figure shows that the processing operation pattern of the drill work element linked at a connection 5-17 is changed from a drill cycle to a deep hole drill cycle by an operation interrupting manipulation of an operator during the processing operation. When the processing operation pattern is changed by such an operation interrupting manipulation of an operator during the processing operation, the operation interrupting manipulation monitoring section 23 extracts the change content and the operation interrupting manipulation database generating section 24 databases the changes as an operation interrupting manipulation database 18, as already mentioned.

Figure 6:
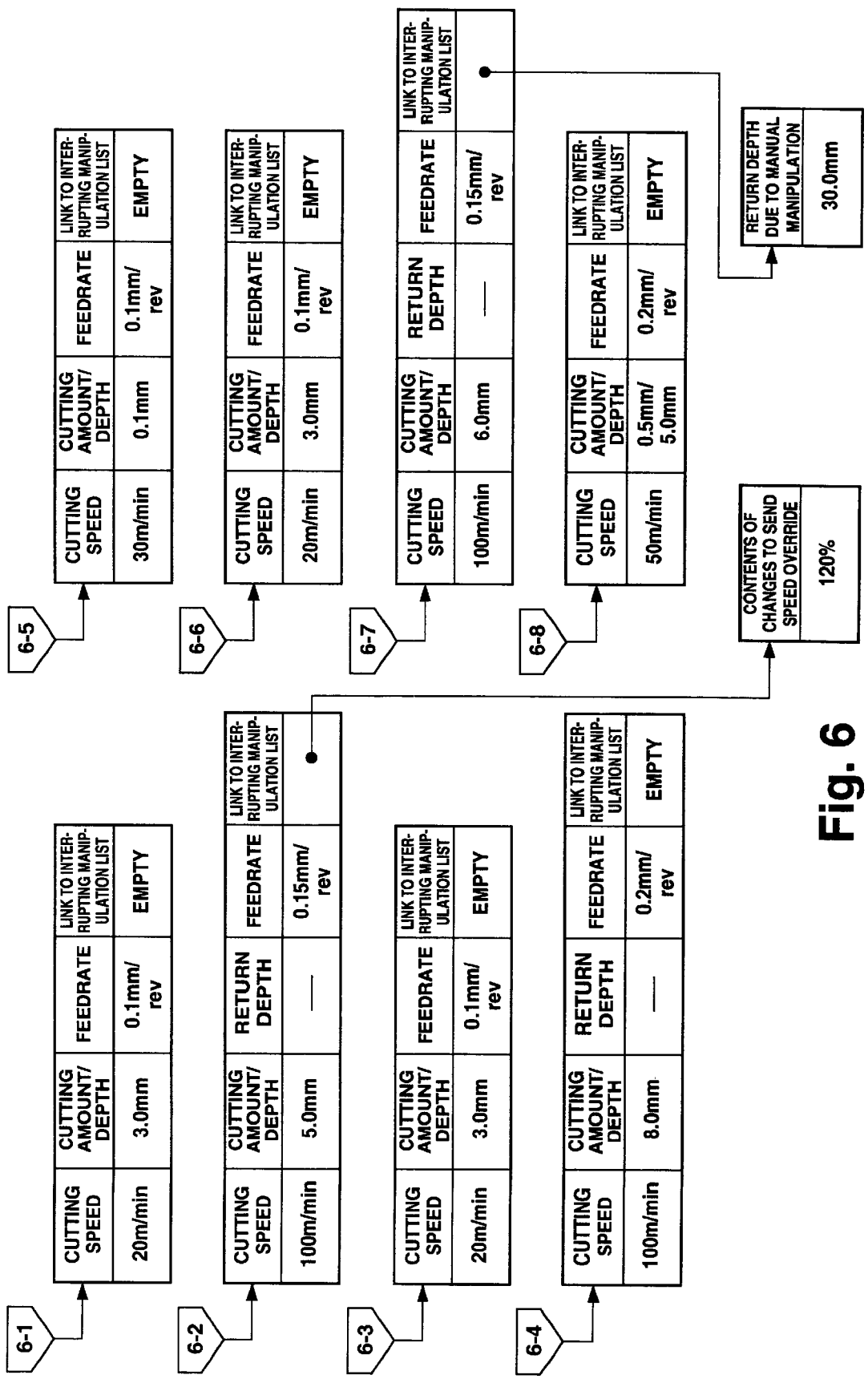
FIG. 6 shows another example of a processing method database and an operation interrupting manipulation history database.

FIG. 6 shows cutting conditions linked from each of the work elements. For example, it is shown that the cutting speed of the drill work element linked at a connection 6-2 is 100 m/min, the cutting depth 5.0 mm, and the feedrate 0.15 mm/rev. The figure also shows that, for the drill work element linked at the connection 6-2, the feedrate override is changed to 120% by an operation interrupting manipulation of an operator during the processing operation and that, for a drill work element linked at a connection 6-7, a manual returning manipulation is performed when the processing depth has reached 30.0 mm by an operation interrupting manipulation of an operator during the processing operation. These changes are, as already stated, extracted by the operation interrupting manipulation monitoring section 23 and is made into a database as an operation interrupting manipulation database 18 at the operation interrupting manipulation database generating section 24.

Even though the databases have been described in the previous description, the structure of the databases used in the present invention is not limited to the structure shown in FIGS. 2, 3, 4, 5, and 6, and can be any suitable structure. An example of generation of the processing method data is described hereinafter in which the processing method database 16 and the operation interrupting manipulation history database 18 have the contents as shown in FIGS. 2 through 6.

If the processing element extracting section 3 or the processing element specifying section 4 shown in FIG. 1 writes the processing element type, the processing dimension, and the processing precision as shown in FIG. 7 as the processing method data, the work expansion model searching section 5 and the work element generating section 6, the tool searching section 7 and tool generating section 8, the processing operation pattern searching section 10 and the processing operation pattern generating section 11, and the cutting condition searching section 12 and the cutting condition generating section 13 search through the processing method database 16, generating the processing method data as shown by the bold line in FIG. 7.

In the embodiment, the timing for reflecting the cutting condition and the processing operation pattern changed by the operation interrupting manipulation of the operator is at the time when the numerical control information generating section 17 generates the numerical control information 19 based on the processing method data section 15. However, there is no restriction to limit the timing to be at that point. The changes to the processing operation pattern can be reflected when the processing operation pattern searching section 10 searches through the processing method database 16 and the operation interrupting manipulation history database 18 and writes to the processing method data section 15. The changes to the cutting condition can be reflected when the cutting condition searching section 12 searches through the processing method database 16 and the operation interrupting manipulation history database 18 and writes to the processing method data section 15.

ADVANTAGES

According to the present invention, processing methods extracted from a numerical control information which has been corrected and edited by a processing operator or numerical control information which has been used for a long period of time can be written and stored in a processing method database. When a programmer generates new numerical control information, the programmer can search through the processing method database for a suitable processing method and can generate a suitable numerical control information by using the search result. It is also possible to write and store extracted operation manipulation and changed processing condition performed by a processing operator using various switches on the NC manipulation panel during the processing operation to a processing method database. When a programmer generates a new numerical control information, the programmer can search through the processing method database for a suitable processing method and can generate suitable numerical control information using the search result.

Thus, by combining the "Analytical Method and Apparatus of an NC Program in NC Processing" (PCT/JP96/03264), "Operation Manipulation History Collecting Apparatus and Method in an NC Processing" (PCT/JP98/03746), (both of which are already filed) and the apparatus and method for generating numerical control information according to the present invention, the process for the programmer to sort and classify his knowledge and to incorporate it in the database when introducing a numerical control information generating apparatus will no longer be required and a database can be generated from the numerical control information that had been used over the years and directly used. After introduction of the apparatus, there is no longer a need for the programmer to ask the processing knowledge from the processing operator for sorting and classifying, and incorporating into the database. The database can be updated from the operation interrupting manipulation during the processing operation and directly used. Furthermore, because the database can be updated using the most recent numerical control information at each and every processing and can be used directly, the database will no longer become obsolete.

What is claimed is:

1. A numerical control information generating apparatus, comprising:
    means for writing and storing a work expansion model as a work expansion database, said work expansion model extracted for each processing element type based on numerical control information;

means for writing and storing a tool, a cutting condition, or a processing operation pattern as a work method database for each work element type based on said numerical control information;

means for specifying said processing element type;

means for searching through said work expansion database for said work expansion model corresponding to said specified processing element type;

means for searching through said work method database for a tool, a cutting condition, or a processing operation pattern required for processing each work element used in said searched work expansion model; and means for generating numerical control information using said searched result.

2. A numerical control information generating apparatus according to claim 1, wherein, measurement information measured at a measuring device is added to the work expansion model to be written and stored in said work expansion database, said means for specifying the processing element type is means capable of specifying said processing element type and processing recision, said means for searching said work expansion model is means or searching through said work expansion database for said work expansion model corresponding to said specified processing element type and processing precision, and said means for searching a tool, a cutting condition, or a processing operation pattern required for said processing is means for searching a tool, a cutting condition, or a processing operation pattern corresponding to said specified processing precision.

3. A numerical control information generating apparatus having a work method database for determining a cutting condition or a processing operation pattern of a work element, for generating numerical control information based on a cutting condition or a processing operation pattern determined by using said work method database, said numerical control information generating apparatus comprising:

means for writing and storing, as an operation interrupting manipulation history database, a cutting condition or a processing operation pattern which have been changed during a processing operation using said numerical control information; and means for generating numerical control information giving a higher priority to the changed cutting condition or processing operation pattern stored in said operation interrupting manipulation history database when generating numerical control information based on a cutting condition or processing operation pattern determined by using said work method database.

4. A numerical control information generating method comprising the steps of:

writing and storing a work expansion model as a work expansion database, said work expansion model extracted for each processing element type based on a numerical control information;

writing and storing a tool, a cutting condition, or a processing operation pattern as a work method database for each work element type based on said numerical control information;

specifying said processing element type;

searching through said work expansion database for said work expansion model corresponding to said specified processing element type;

searching through said work method database for a tool, a cutting condition, or a processing operation pattern required for processing each work element used in said searched work expansion model; and generating numerical control information using said searched result.

5. A numerical control information generating method in a numerical control information generating apparatus having a work method database for determining a cutting condition or a processing operation pattern of a work element, for generating numerical control information based on a cutting condition or a processing operation pattern determined by using said work method database, said numerical control information generating method comprising the steps of:

writing and storing, as an operation interrupting manipulation history database, a cutting condition or a processing operation pattern which have been changed during a processing operation using said numerical control information; and generating numerical control information giving a higher priority to the changed cutting condition or processing operation pattern stored in said operation interrupting manipulation history database when generating numerical control information based on a cutting condition or processing operation pattern determined by using said work method database.

6. A medium in which computer programs for executing each of the steps for a method according to claim 4 are stored.

7. A medium in which computer programs for executing each of the steps for a method according to claim 5 are stored.

* * * * *